US008172256B2

(12) United States Patent
Fine

(10) Patent No.: US 8,172,256 B2
(45) Date of Patent: May 8, 2012

(54) CART

(76) Inventor: Ami Amos Fine, Hadera (IL)

( * ) Notice: Subject to any disclaimer, the term of this patent is extended or adjusted under 35 U.S.C. 154(b) by 235 days.

(21) Appl. No.: 12/382,410

(22) Filed: Mar. 16, 2009

(65) Prior Publication Data
US 2010/0230934 A1    Sep. 16, 2010

(51) Int. Cl.
B62B 3/02 (2006.01)
(52) U.S. Cl. .......... 280/651; 280/638; 280/639; 280/38; 280/641
(58) Field of Classification Search .................. 280/638, 280/639, 38, 641, 651
See application file for complete search history.

(56) References Cited

U.S. PATENT DOCUMENTS

| 2,877,047 | A | * | 3/1959 | Weil ................................ 296/20 |
| 4,199,170 | A |   | 4/1980 | Hubner et al. |
| 4,251,178 | A |   | 2/1981 | Bourgraf |
| 5,503,424 | A |   | 4/1996 | Agopian |
| 5,533,361 | A |   | 7/1996 | Halpern |
| 5,649,718 | A | * | 7/1997 | Groglio ......................... 280/641 |
| 6,024,527 | A |   | 2/2000 | Soriano |
| 6,045,150 | A |   | 4/2000 | Al-Toukhi |
| 6,070,899 | A |   | 6/2000 | Gines |
| 6,338,518 | B1 |   | 1/2002 | D'Annunzio |
| 6,495,756 | B1 |   | 12/2002 | Burke et al. |
| 6,766,931 | B2 |   | 7/2004 | Wolf |
| 7,080,844 | B2 | * | 7/2006 | Espejo ..................... 280/33.995 |
| 7,188,847 | B1 |   | 3/2007 | Friedman |
| 7,380,803 | B2 |   | 6/2008 | Thomas |
| 2008/0093827 | A1 |   | 4/2008 | Silberberg |
| 2008/0203704 | A1 |   | 8/2008 | McCracken et al. |
| 2009/0283989 | A1 |   | 11/2009 | Abecassis |
| 2010/0140887 | A1 |   | 6/2010 | Yehiav et al. |

OTHER PUBLICATIONS

International Search Report for PCT/IB2010/051009 dated Sep. 23, 2010.

* cited by examiner

Primary Examiner — J. Allen Shriver, II
Assistant Examiner — Bryan Evans
(74) Attorney, Agent, or Firm — Eitan Mehulal Law Group

(57) ABSTRACT

The present invention includes a cart which includes: a chassis connected to a plurality of wheels; a basket mounted on the chassis and adapted to store one or more items therein; and a bridge element which is formed as an integral part of the cart and is adapted to fit onto an edge of a vehicular trunk, wherein the bridge element of the cart is at an area of the cart located between the basket and the wheels.

19 Claims, 14 Drawing Sheets

CART

FIELD

Some embodiments are related to the field of carts, and more particularly to shopping carts.

BACKGROUND

Many stores and supermarkets provide shopping carts which may be used by customers. For example, a shopping cart includes an open basket which is rigidly connected to a bottom frame having four wheels. The customer puts inside the shopping cart items that the customer wishes to purchase. At the checkout point, the customer takes the items out from the shopping cart, and allows the cashier to scan the items so that the customer may pay for the purchase. Then, the purchased items are placed back into the shopping cart, either directly or optionally using one or more shopping bags.

Unfortunately, some stores do not allow the customer to take the shopping cart out of the store, for example, towards the customer's vehicle which may be parked outside the store or in a nearby parking lot. Accordingly, the customer may be required to hand-carry the purchased items, which may be heavy or cumbersome to carry, from the checkout point within the store to the vehicle.

Some stores allow the customer to take the shopping cart out of the store, for example, towards the customer's vehicle. Unfortunately, once the customer arrives at his vehicle, the customer has to manually unload the shopping cart, by transferring each purchased item (or each bag containing one or more purchased items) from the shopping cart to the customer's vehicle, e.g., to the trunk or compartment of the vehicle. This process may be inconvenient, effort consuming and/or time-consuming, particularly when the customer purchases a relatively large number of items or one or more relatively heavy items.

SUMMARY

Some embodiments include, for example, carts, collapsible carts and/or foldable carts, In some embodiments, for example, a cart includes: a collapsible or non-collapsible chassis connected to a plurality of wheels; a basket mounted on the chassis and adapted to store one or more items therein; and a bridge element adapted to fit onto an edge of a vehicular trunk, wherein the bridge element is connected at a point located between said basket and said wheels.

In some embodiments, for example, the bridge element is moveable on one or more rails connected underneath the basket substantially in parallel to a long axis of the basket.

In some embodiments, for example, the bridge element is moveable on one or more rails connected to the chassis substantially in parallel to a long axis of the basket.

In some embodiments, for example, the bridge element has a general shape of an upside-down U.

In some embodiments, for example, the basket extends forward relative to the chassis.

In some embodiments, for example, the bridge element is adapted to reach a position extending beyond the length of the chassis.

In some embodiments, for example, the cart includes: one or more wheels connected at a bottom of a front end of the basket (or at a front end of a bottom of the basket, or in proximity to the front-end of the basket and/or the bottom of the basket, or at other suitable places), to smoothly glide the basket on a bottom of the vehicular trunk.

In some embodiments, for example, the cart includes: one or more wheels connected at a front end of a bottom of a of the basket, to smoothly glide the basket on a bottom of the vehicular trunk.

In some embodiments, for example, the chassis comprises: a first set of one or more collapsible beams, connecting a right side of the basket with a right side of the chassis; and a second set of one or more collapsible beams, connecting a left side of the basket with a left side of the chassis.

In some embodiments, for example, the first set of collapsible beams comprises one or more pivot brackets able to collapse said first set of collapsible beams; and the second set of collapsible beams comprises one or more pivot brackets able to collapse said second set of collapsible beams.

In some embodiments, for example, at least one of the first and second sets of collapsible beams is connected through to a pullable cable adapted to collapse said at least one set of collapsible beams upon pulling of said cable.

In some embodiments, for example, an end of the cable is connected to a handle adapted to be pulled by a hand of a human being.

In some embodiments, for example, the cable passes through a one-way roll-up mechanism adapted to maintain the cable partially pulled upon release of said handle.

In some embodiments, for example, a height of the basket from the ground is user-modifiable by modifying an angle of one or more of the pivot brackets.

In some embodiments, for example, the cart includes: a multi-step locking mechanism adapted to lock the height from the ground of the basket at a particular height set by a user.

In some embodiments, for example, the multi-step locking mechanism comprises: a set of ratchets; and a sliding pole, adapted to be moveable along a downward direction along said set of ratchets, and adapted to be unmovable along an upward direction along said set of ratchets.

In some embodiments, for example, the multi-step locking mechanism is lockable to avoid folding of the chassis, and is unlockable to allow folding of the chassis.

In some embodiments, for example, the basket is detachably attached to said chassis through one or more connectors.

In some embodiments, for example, the chassis comprises an extendable rail; and the basket is adapted, upon its release from said chassis, to glide along said extendable rail into said vehicular trunk.

In some embodiments, for example, the cart includes: one or more wheels connected at a bottom of a front end of the basket, to smoothly glide the basket on a bottom of said vehicular trunk.

In some embodiments, for example, one or more rails are connected underneath the basket and are connected to said bridge element; the basket is detachable from the chassis; and the basket is forward-movable along said one or more rails and relative to said bridge element when said bridge element is positioned over the edge of said vehicular trunk.

Some embodiments may provide other and/or additional benefits and/or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1A:
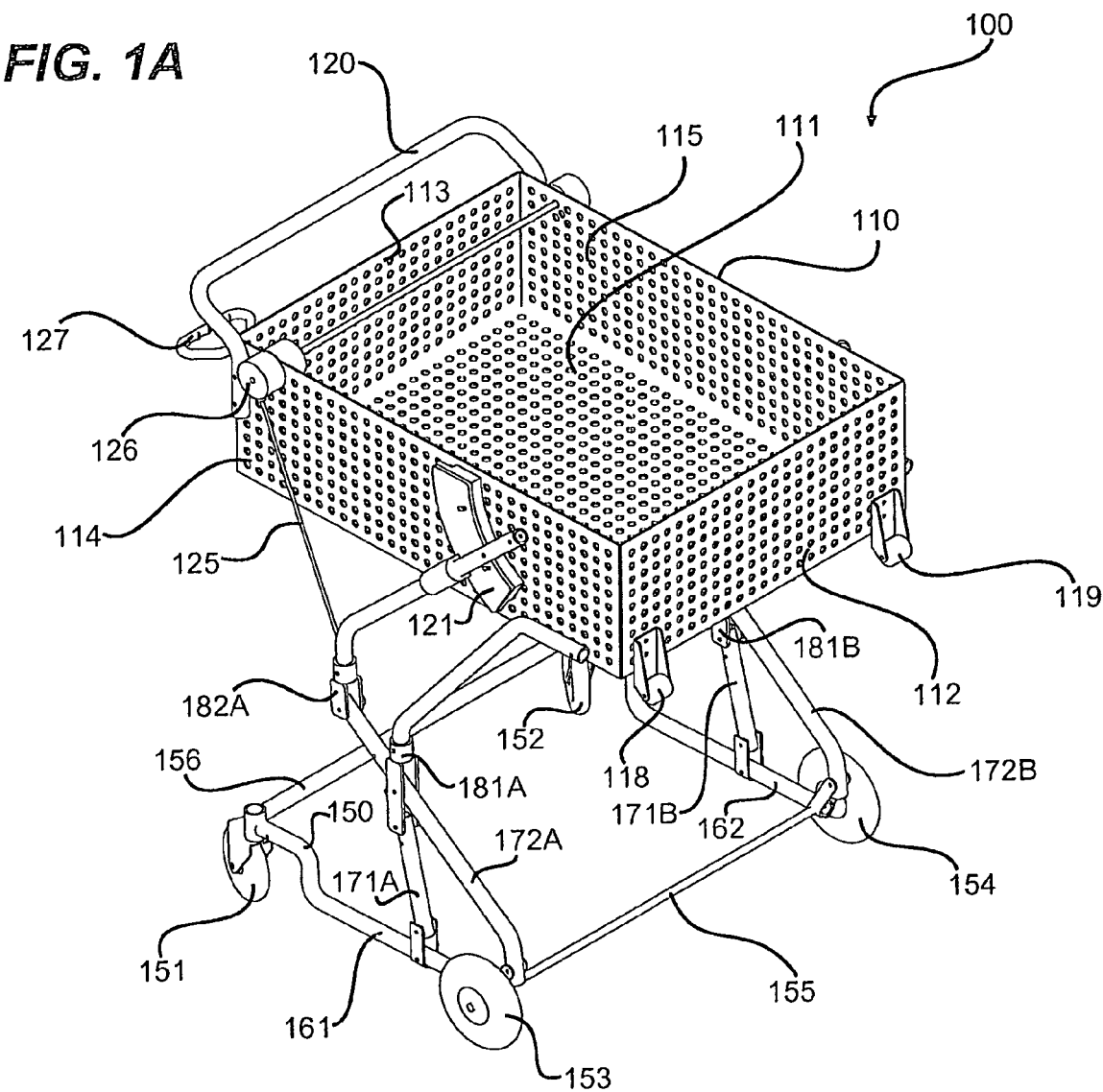
FIG. 1A is a schematic illustration of a three-dimensional isometric top-view of a cart in an unfolded state, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Although portions of the discussion herein may relate, for demonstrative purposes, to a shopping cart or to a supermarket car, some embodiments (or some features thereof) may be used in conjunction with various other types of carts and/or devices, for example, a stroller, a baby stroller, a carriage, a baby carriage, a cart used for carrying tools, a farm cart, a cart used for carrying one or more pre-defined items, an airport cart, a cart used typically in airports or train stations or central bus stations, or the like.

As an overview, some embodiments may provide a collapsible or foldable shopping cart, which may be inserted, with a significantly small effort, into a car trunk or a car compartment while the cart is loaded with items. The cart may subsequently be unload from the car trunk with its contents, and may expand to an open position and serve to deliver the content of the cart to the final destination (e.g., a home or other residence).

In some embodiments, the cart includes two components: a collapsible chassis, and a load box or a basket able to store items therein. The basket is a generally rectangular container, and is connected to the chassis. In some embodiments, the basket is non-detachable or non-separable from the chassis, and vice versa.

In some embodiments, the cart may optionally include an (optionally collapsible) "trunk invasion component" or "trunk penetration component". When the cart is extended and erect, the trunk invasion component invades into the car trunk in order to provide support for the front side of the cart when its wheels and chassis are folded. In some embodiments, the trunk invasion component may be equipped with wheels or other sliding surfaces, for example, to reduce friction and/or to provide safe and smooth movement. The trunk invasion component may be connected to the front of the cart. In some embodiments, in a collapsed or folded state, the trunk invasion component does not extend, or only slightly extends, beyond the general outline of the cart or of the basket. In other embodiments, the trunk invasion component may extend beyond the general outline of the cart or of the basket; for example, by approximately one percent, by approximately two percent, by approximately five percent, by approximately ten percent, or by other suitable dimension ratio.

In some embodiments, for example, the bottom side of the basket may include an upside-down U-shape protective component or bridge element, which may be movable using one or more rails along the elongated axis of the basket. The protective component or bridge is attached to the bottom of the basket (or to other suitable part of the cart, for example, to the chassis beneath the basket, or to the front side of the cart) and may slide from the front to the rear side of the basket, and vice versa. In some embodiments, for example, the protective component may support the load of the basket and items stored therein; may prevent harm to the trunk or the car; and may further operate as a safety measure to prevent the cart from slipping to the ground when taking the cart out of the trunk.

In some embodiments, the chassis may include one double-leg on each side of the cart (namely, on the right side and on the left side). Each double-leg may include two (or more) beams, and may further include multiple pivot brackets or joins. In some embodiments, the two double-legs may be interconnected; and the two double-legs may be collapsed and expended from a single point.

Figure 1B:
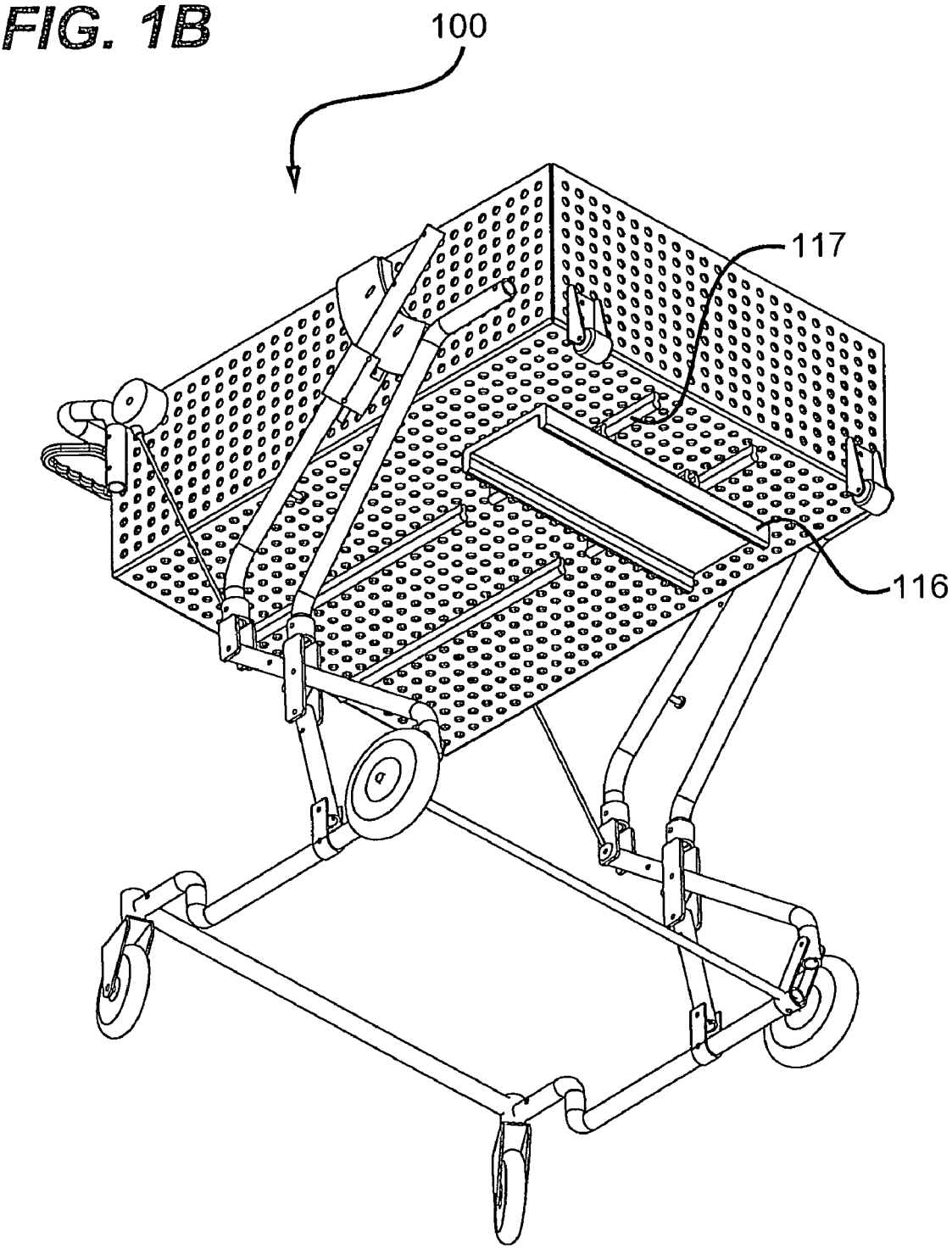
FIG. 1B is a schematic illustration of a three-dimensional isometric bottom-view of the cart in an unfolded state, in accordance with some demonstrative embodiments.
Figure 1C:
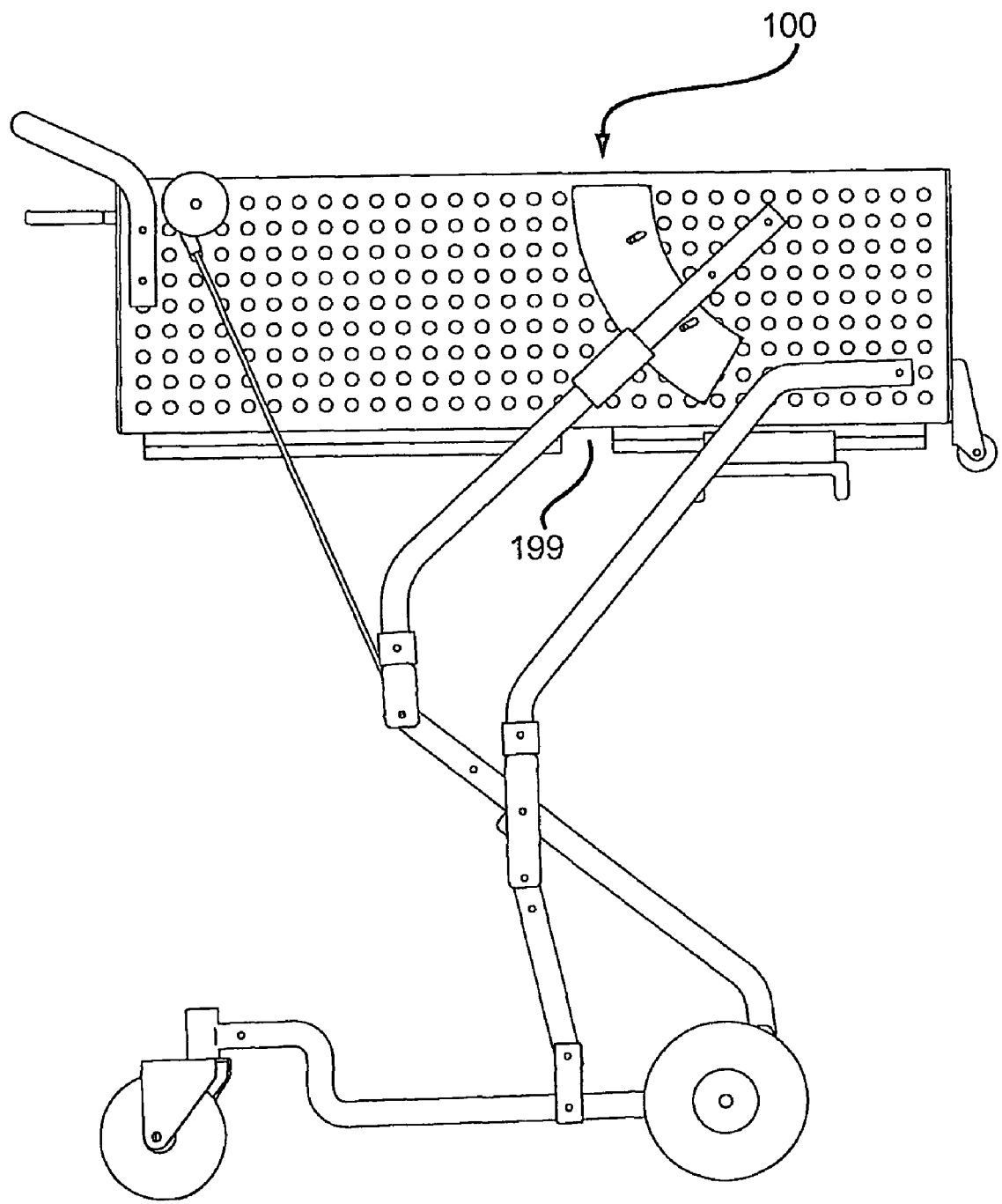
FIG. 1C is a schematic illustration of a side-view of the cart in an unfolded state, in accordance with some demonstrative embodiments.
Figure 2A:
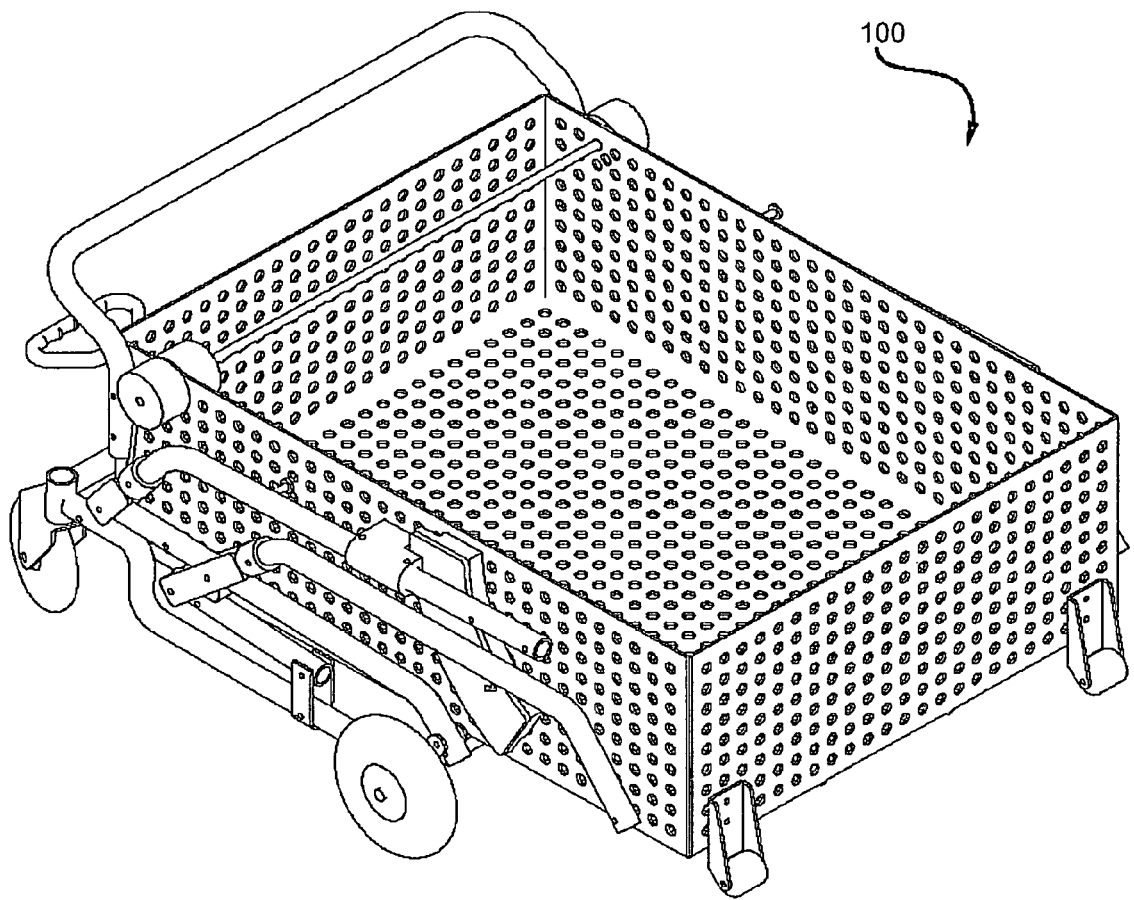
FIG. 2A is a schematic illustration of a three-dimensional isometric top-view of the cart in a folded state, in accordance with some demonstrative embodiments.
Figure 2B:
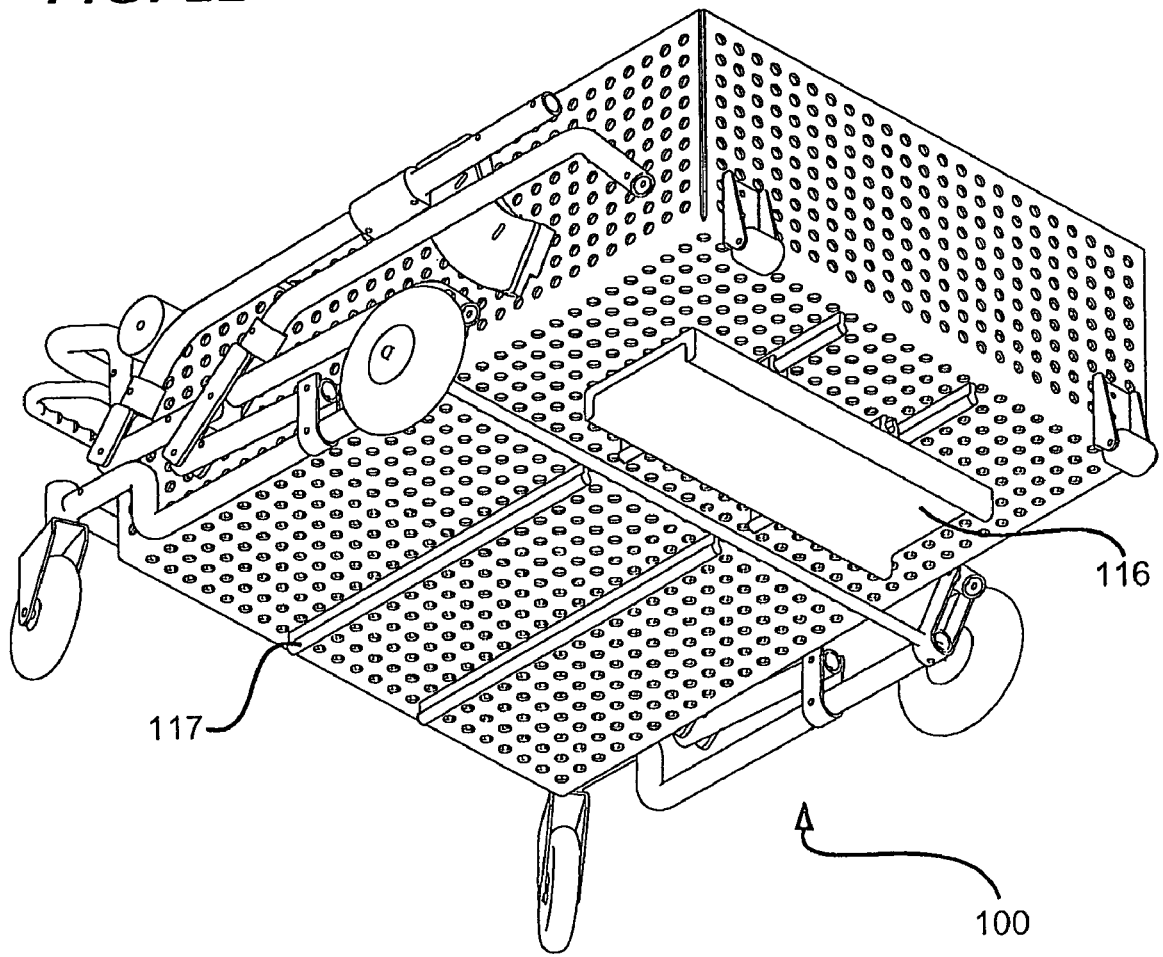
FIG. 2B is a schematic illustration of a three-dimensional isometric bottom-view of the cart in a folded state, in accordance with some demonstrative embodiments.
Figure 2C:
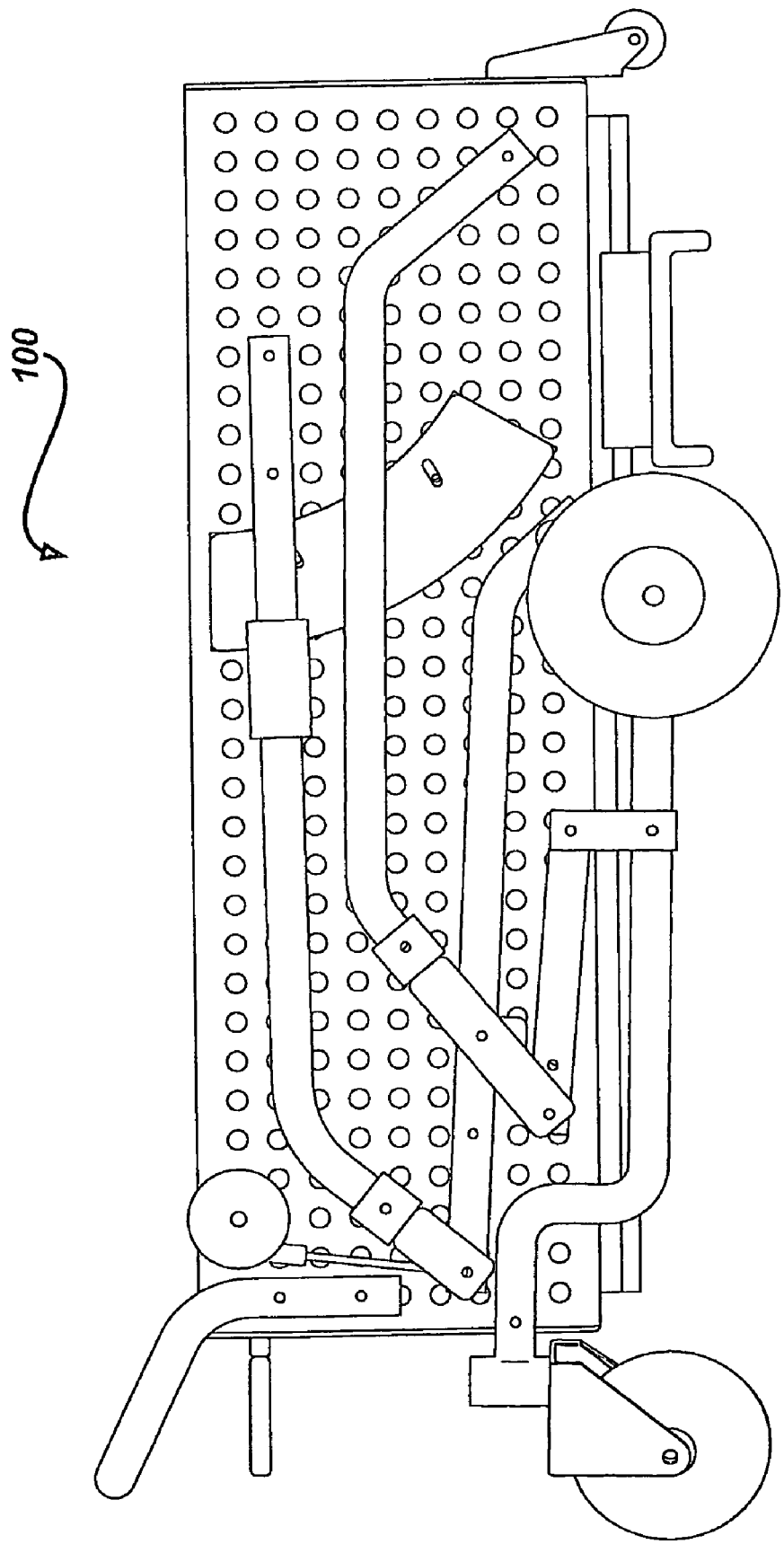
FIG. 2C is a schematic illustration of a side-view of the cart in a folded state, in accordance with some demonstrative embodiments.

Reference is now made to FIG. 1A, which is a schematic illustration of a three-dimensional isometric top-view of a cart 100 in an unfolded state, in accordance with some demonstrative embodiments; to FIG. 1B, which is a schematic illustration of a three-dimensional isometric bottom-view of cart 100 in an unfolded state, in accordance with some demonstrative embodiments; and to FIG. 1C, which is a schematic illustration of a side-view of cart 100 in an unfolded state, in accordance with some demonstrative embodiments. Reference is further made to FIG. 2A, which is a schematic illustration of a three-dimensional isometric top-view of cart 100 in a folded state, in accordance with some demonstrative embodiments; to FIG. 2B, which is a schematic illustration of a three-dimensional isometric bottom-view of cart 100 in a folded state, in accordance with some demonstrative embodiments; and to FIG. 2C, which is a schematic illustration of a side-view of cart 100 in a folded state, in accordance with some demonstrative embodiments.

In some embodiments, cart 100 may include a basket 110, which may be connected to or mounted on a mount or a chassis 150. In some embodiments, basket 110 may be generally elongated and generally box-shaped or generally rectangular, or may have other suitable shape (e.g., oval, ellipse shaped, egg shaped, circular, a box having rounded or smooth or non-sharp corners, a hexagon, an octagon, or the like). For example, basket 110 may have a generally horizontal bottom wall 111, which may be generally parallel to the ground. Basket 110 may further have two smaller side walls 112-113, for example, a front side wall 112 and a rear side wall 113, which may be generally vertical or generally perpendicular to the ground. Basket 110 may further have two longer, or elongated, side walls 114-115, for example, a right side wall 114 and a left side wall 115, which may be generally vertical or generally perpendicular to the ground.

In some embodiments, basket 110 may have an open upper side or an open upper end, namely, basket 110 may not have a sixth wall or a cover, and may be open at its top in order to allow unobstructed insertion of items into basket 110. In other embodiments, basket 110 may optionally include, or may be associated with, a top cover which may be used to cover the top side of basket 110, or a portion thereof. For example, a removable cover may be used, or a foldable cover may be used, to allow a user to cover and uncover the top side of basket 110, e.g., in order to protect items from rain, snow, sunlight, dust, or the like. In yet other embodiments, the upper side of basket 110 may be partially covered with a removable or non-removable cover, and may be partially non-covered, in order to allow the user to store some items under the partial cover and some items without the protection of the partial cover.

In some embodiments, basket 110 may be connected to one or more handles; for demonstrative purposes, a generally horizontal handle 120 is shown. Other types of handles may be used. Handle 120 may allow the user to conveniently grip the handle 120 in order to push and/or maneuver the cart 100.

In some embodiments, basket 110 may be rigidly connected or attached to the chassis 150 such that basket 110 may not be separated or disconnected from chassis 150. In other embodiments, basket 110 may be detachably-attached to chassis 150 (or vice versa), using one or more clips or locks, such that basket 110 may optionally be detached, separated or disconnected from the chassis 150.

In some embodiments, the chassis 150 may be collapsible or foldable, as described herein. In some embodiments, the chassis 150 may include multiple wheels in order to allow the user to conveniently push, propel and/or maneuver the cart 100, by applying directional force on the handle 120. For example, two rear wheels 151-152 may be directionally locked and may be able to rotate (e.g., forward and backward, or clockwise and anti-clockwise) but may not be able to turn (e.g., left or right); whereas two front wheels 153-154 may be directionally unlocked and may be able to both rotate as well as turn.

For demonstrative purposes, four wheels 151-154 are shown; yet some embodiments may utilize other number of wheels or other configuration of wheels. In some embodiments, for example, a tricycle configuration may be used, in which a single front wheel is used (e.g., able to rotate and to directionally turn) together with two directionally-locked rear wheels. In other embodiments, six wheels may be used at the bottom part of chassis 150, e.g., similar to a six-wheel configuration of some buses or some trucks. In some embodiments, other suitable configurations may be used.

In some embodiments, front wheels 153-154 may be connected through a generally horizontal front axle 155. In some embodiments, a generally horizontal rear axle 156 may be used to connect the rear wheels 151-152.

In some embodiments, the right-front wheel 153 may be connected to the right-rear wheel 151 through a right-side bar 161; and the left-front wheel 154 may be connected to the left-rear wheel 152 through a left-side bar 162, which may be generally parallel to the right-side bar 161. In some embodiments, each one of bars 161-162 may be generally horizontal at one end (e.g., at the front end), and may have an S-shape or a J-shape at the other end (e.g., at the rear end), in order to connect to the corresponding wheel from the top of the wheel (e.g., using a horizontal pivot or axis) and thereby allowing directional movement of the wheel in addition to wheel rotation.

In some embodiments, the front side of the basket 110 may extend forward beyond the front wheels 153-154. For example, in some embodiments, approximately 25 percent or 33 percent or 40 percent of the length of basket 110 may extend forward beyond the front wheels 153-154.

The chassis 150 may include one or more generally vertical and collapsible or foldable beams. For demonstrative purposes, two sets of beams are shown; other number of beams or sets of beams may be used. The first set of beams may include a right-side shorter beam 171A and a left-side shorter beam 171B. The second set of beams may include a right-side longer beam 172A and a left-side longer beam 172B.

In some embodiments, for example, the right-side shorter beam 171A may be generally C-shaped, and may connect the right-side bar 161 (e.g., at approximately 25 or 33 percent of its length measured from the right-front wheel 153) with the front side of the right wall 114 of basket 110. Similarly, the left-side shorter beam 171B may be generally C-shaped, and may connect the left-side bar 162 (e.g., at approximately 25 or 33 percent of its length measured from the left-front wheel 154) with the front side of the left wall 115 of basket 110.

For example, the right-side longer beam 172A may be generally S-shaped, and may connect the front end of the right-side bar 161 with the right wall 114 of basket 110 (e.g., at approximately 30 or 35 percent of the length of the right wall 114 measured from the front side wall 111). Similarly, the left-side longer beam 172B may be generally S-shaped, and may connect the front end of the left-side bar 162 with the left wall 115 of basket 110 (e.g., at approximately 30 or 35 percent of the length of the left wall 115 measured from the front side wall 111).

In some embodiments, each one of the beams 171A, 171B, 172A and 172B may include one or more joints or pivot brackets. For demonstrative purposes, each one of the beams 171A, 171B, 172A and 172B is shown with one pivot bracket; yet in some embodiments, each one of the beams 171A, 171B, 172A and 172B may include two or more joints or pivot brackets, for example, in order to increase the flexibility of collapsing or expanding the cart 100.

In some embodiments, for example, the right-side shorter beam 171A may have a pivot bracket 181A, which allows the right-side shorter beam 171A to fold or collapse. The pivot bracket 181A may be in an extended position, in which the right-side shorter beam 171A is fully extended; or may be in a closed position, in which the right-side shorter beam 171A is folded or collapsed, partially or substantially entirely. In some embodiments, the right-side shorter beam 171A may optionally include more than one pivot bracket 181A.

Similarly, the left-side shorter beam 171B may have a pivot bracket 181B, which allows the left-side shorter beam 171B to fold or collapse. The pivot bracket 181B may be in an extended position, in which the left-side shorter beam 171B is fully extended; or may be in a closed position, in which the left-side shorter beam 171B is folded or collapsed, partially or substantially entirely. In some embodiments, the left-side shorter beam 171B may optionally include more than one pivot bracket 181B.

In some embodiments, the right-side longer beam 172A may have a pivot bracket 182A, which allows the right-side longer beam 172A to fold or collapse. The pivot bracket 182A may be in an extended position, in which the right-side longer beam 172A is fully extended; or may be in a closed position, in which the right-side longer beam 172A is folded or collapsed, partially or substantially entirely. In some embodiments, the right-side longer beam 172A may optionally include more than one pivot bracket 182A.

Similarly, the left-side longer beam 172B may have a left-side pivot bracket (not shown), which allows the left-side longer beam 172B to fold or collapse. The left-side pivot bracket may be in an extended position, in which the left-side longer beam 172B is fully extended; or may be in a closed position, in which the left-side longer beam 172B is folded or collapsed, partially or substantially entirely. In some embodiments, the left-side longer beam 172B may optionally include more than one pivot bracket.

In some embodiments, a portion of the right-side longer beam 172A may optionally pass through a portion of the pivot bracket 181A of the right-side shorter beam 171A. Similarly, a portion of the left-side longer beam 172B may optionally pass through a portion of the pivot bracket 181B of the left-side shorter beam 171B. In some embodiments, the right-side longer beam 172A may be connected to the right-side shorter beam 171A through a joint or a pivot bracket; and similarly, the left-side longer beam 172B may be connected to the left-side shorter beam 172B through another joint or pivot bracket.

In some embodiments, the bottom side of the bottom wall 111 of basket 110 may have an upside-down U-shaped bridge element 116 (or "n" shaped bridge element) connected thereto. The bridge element 116 may be able to move back and forth, along a portion of the elongated axis of basket 110, over one or more guideways or rails 117 (e.g., two rails 117 as shown). In some embodiments, the bridge element 116 may be used in order to protect the trunk of a vehicle once the basket 110 is placed thereon; and the motion of the bridge element 116 over the rails 117 may allow a controlled and scratch-free sliding motion of the basket 110 into the trunk of the vehicle. In some embodiments, the width of the bridge element 116 (e.g., from the right side to the left side) may be smaller or slightly smaller than the width of the basket 110, such that bridge element 116 may be smaller or slightly smaller, in its long dimension, than the length of front axle 155. For example, in some embodiments, the width of the bridge element 116 may be approximately 5 percent smaller, 10 percent smaller, 15 percent smaller, 20 percent smaller, 30 percent smaller, 40 percent smaller, or 50 percent smaller than the width of the basket 110. In other embodiments the width of the bridge element 116 may be similar or substantially identical to the width of the basket 110. In other embodiments, the width of the bridge element 116 may be greater or slightly greater than the width of the basket 110, for example, approximately one percent greater, two percent greater, three percent greater, five percent greater, ten percent greater, or the like. Other suitable size ratios may be used.

In some embodiments, the rails 117 may be connected to the basket 110, for example, underneath the basket 110. In other embodiments, the rails 117 may be connected to the chassis 150. In some embodiments, the rails 117, or at least a portion thereof, may be substantially parallel or generally parallel to a long axis of the basket 110; may be substantially parallel or generally parallel to the longest dimension of the basket 110; may be substantially perpendicular to the rear side wall 113 and/or to the front side wall 112; may extend from the rear side wall 113 (or from a position relatively close to the rear side wall 113) to the front side wall 112 (or to a position relatively close to the front side wall 112); may be substantially parallel or generally parallel to the ground; may be substantially perpendicular or generally perpendicular to the front axle 155 and/or to the rear axle 156; may be substantially parallel or generally parallel to the right-side bar 161, or to the left-side bar 162, or to a line or a bar connecting the right-front wheel 153 with the right-rear wheel 151, or to a line or a bar connecting the left-front wheel 154 with the left-rear wheel 152; or may be otherwise suitably positioned.

Optionally, one or more guiding wheels 118-119 may be located at the front side of the basket 110, to allow smoother and substantially scratch-free and/or friction-free sliding motion of the basket 110 into the trunk of the vehicle. In some embodiments, sliding surfaces or other sliding components or guiding components may be used, instead of or in addition to the guiding wheels 118-119.

In some embodiments, cart 110 may be implemented such that the distance between the ground and the bottom wall 111 of basket 110 ground may be higher, or slightly higher (e.g., approximately 5 or 10 or 15 or 20 percent higher) than a typical and/or average height of a trunk of a car. For example, in some embodiments, data may be collected in order to determine the average or typical height from the ground of trunks of top-selling or most-common vehicles (e.g., Toyota Camry, Toyota Corolla, Honda Accord, GMC Impala, Ford Taurus, or the like), and the collected and analyzed data may be used in order to determine the height from the ground to the bottom wall 111 of basket 110 (e.g., approximately 70 centimeters in Toyota Camry, approximately 73 centimeters in Toyota Corolla, approximately 76 centimeters in GMC Malibu, or the like).

In some embodiments, the height from the ground of the bottom wall 111 of basket 110 may be fixed and pre-defined, for example, based on typical and/or average heights from the ground of trunks (or edges of trunks, which are higher than the bottom of the trunk). In other embodiments, cart 100 may include a mechanism or one or more components which allow the user to modify the height from the ground of basket 110, for example, by further extending or by partially collapsing one or more of the beams (e.g., beams 171A, 171B, 172A and/or 172B), or using other suitable height-changing mechanisms, height-increasing mechanisms, or height-reducing mechanisms.

In some embodiments, the user may push the cart 100 towards the open trunk of the vehicle, such that the front side of the basket 110 extends over the edge of the trunk. Then, the user may further delicately push or slightly maneuver the cart 100 such that the bridge element 116 is above the edge of the trunk. The user holds the handle 120, and collapses or folds the beams 171A, 171B, 172A and 172B, such that the beams 171A, 171B, 172A and 172B become collapsed and folded beneath the basket 110 and in proximity to the basket 110, or such that the 171A, 171B, 172A and 172B become substantially parallel to the bottom wall 111 (or in a small angel relative to the bottom wall 111), in contrast to being substantially perpendicular to the bottom wall 111 when the cart 100 is erect. The cart 110 is now temporarily held and balanced in place, for example, by the bridge element 116 which is held by the trunk edge, and by the handle 120 which is held by the user. The user may now slightly lift the handle 120, which is connected to the basket 110, and may thereby slide gently the basket 110 forward into the trunk, as the bridge element 116 slides backwards over the rails 117. Once the bridge element 116 traverses the entire length of the rails 117 (e.g., which may be corresponding substantially to the entire length of the basket 110), the user slightly further lift the handle 120 and may push the portion of basket 110 which is still outside the trunk, into the trunk; optionally utilizing the guiding wheels 118-119 which may allow a smooth and scratch-free motion within of the basket 110 within the trunk. Once the rear side wall 113 traverses the edge of the trunk, and the entire basket 110 is located beyond the edge of the trunk, the user may delicately lower the basket 110 using the handle 120, such that the basket 110 (and the chassis 150 which is collapsed and folded underneath it) lies within the trunk. It is noted that the basket 110 may remain in a substantially horizontal position during the entire insertion process, or at a relatively low angel (e.g., approximately 10 or 20 degrees relative to the ground), such that items within the basket 110 remain therewith and do not "spill out" of the basket 110 during the insertion process. It is further noted that in some embodiments, the wheels 151-154 of cart 110 may be implemented such that they do not interfere with folding of cart 100; for example, once cart 100 is folded, wheels 151-154 may be protruding externally (e.g., sideways) to basket 110, or may be beneath basket 110.

A substantially reversed order of operations may be used for removal of the cart 100 from the trunk of the vehicle. The user opens the trunk, and holds the handle 120 of the cart 100. The user lifts the handle 120, and pulls the basket 110 upward and backward (towards the user), such that the bridge element 116 is placed on the edge of the trunk. The guiding wheels 118-119 may assist the user to perform a smooth and scratch-free backward pulling motion. The user than proceeds to pull backwards the basket 110, such that the bridge element 116 slides forward over the rails 117. The upside-down U-shape of the bridge element 116 operates as a brake to prevent the user from accidentally pulling back the basket 110 beyond the edge of the trunk prior to unfolding or extending the folded chassis 150. Once the basket 110 (or a major portion thereof) is external to the trunk, the chassis 150 is extended or unfolded to be in an erected position, in order to support the weight of the basket 110 and its contents once the entire basket 110 is pulled backward out of the trunk.

Figure 3:
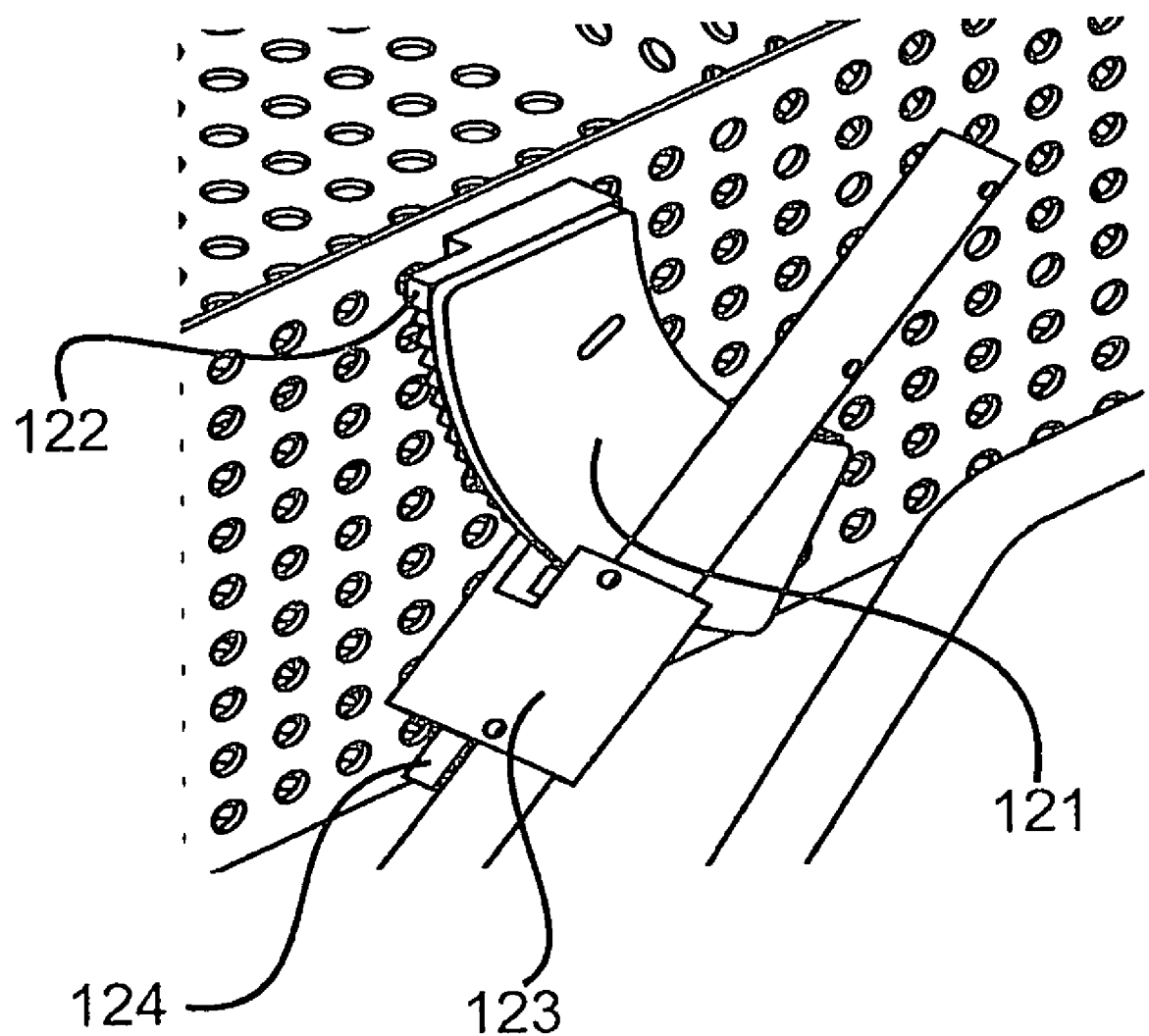
FIG. 3 is a schematic illustration of a three-dimensional isometric view of a portion of the cart, showing in greater detail a multi-step locking mechanism, in accordance with some demonstrative embodiments.

Reference is now made to FIG. 3, which is a schematic illustration of a three-dimensional isometric view of a portion of cart 100, showing in greater detail a multi-step locking mechanism 121, in accordance with some demonstrative embodiments.

In some embodiments, due to differences between the heights of trunks of various vehicles, cart 100 may include the multi-step locking mechanism 121 which allows the user to lock the chassis 150 of the cart 100 to accommodate the height of the particular vehicle trunk of the user. This allows the user to take out the cart 100 (e.g., substantially empty of any stored items) out of his vehicle trunk; to lock the cart 100 on a particular height; to utilize the cart 100 by filling it with items; and to return with the cart 100 to the vehicle, while the height of cart 100 is maintained due to the multi-step locking mechanism 121 and accommodates the height of the particular vehicle trunk of the user. In some embodiments, this may avoids a situation in which the cart 100 has a relatively large height (e.g., to accommodate the highest of common vehicle trunks), which may result in a "free fall" of possibly several centimeters when the cart 100 is folded into the car; the multi-step locking mechanism 121 thus avoids such "free-fall", as well as safety concerns and user concerns associated therewith. In some embodiments, the multi-step locking mechanism 121 may further provide stability to cart 100, for example, along the horizontal axis, thereby improving the durability and/or the performance of the chassis 150 and its components.

In some embodiments, the multi-step locking mechanism 121 may include, for example, a rigid clip or sleeve 123, a sliding pole 124, and a set of teeth or ratchets 122. In some embodiments, for example, the rigid sleeve 123 may provide strength and horizontal stability; the sliding pole 124 may be able to slide downward along the set of teeth or ratchets 122, such that a sliding upward is not available or not easily available due to a locking provided by the sliding pole 124 in the upward direction. The length of the set of teeth or ratchets 122 may allow a variety of locking positions, thereby providing a variety of heights into which the cart 100 may be locked.

Referring now back to FIGS. 1A-1C and 2A-2C, in some embodiments, cart 100 may include a cable 125 to facilitate the folding of the cart 100. For example, the user may arrive with the cart 100 to her vehicle; the user may place the cart 100 such that the basket 110 extends into the open trunk, and such that the bridging element 116 is placed above or on top of panel of the trunk; the user may unlock the locked chassis 150, and may pull back the cable 125 in order to pull-up and fold the chassis 150 into a folded position under the basket 110. The cable 125 may be connected to a non-returning rolling mechanism 126 and may end with a pull handle 127, similar to or resembling (from a visual point of view, and/or from an external point-of-view) a cable and rolling mechanism of a lawn mower starter: for example, pulling of the handle 127 rotates an internal rolling component (e.g., a round or circular drum-shaped unit) which in turn rolls-up the cable 125, which in turn pulls up the folding components of the chassis 150. In some embodiments, the rolling mechanism 126 includes two rolling components that share a common axis or axle. For example, a first rolling component is a "user roller", having a spiral spring and a free return mechanism; the first rolling component operates, upon the user pulling of the handle 127, to rotate around the common axel and squeeze the spring; when the user releases the handle 127, the first rolling component returns to its default position due to the power of the spring. As a result of the common axel, the rotation of the first rolling component also rotates the second rolling component, for example, a "legs roller" which may be a cylinder having a non-return mechanism. This split mechanism allows the user to practice several relatively short pulling operations in order to perform a full collapse operation. In some embodiments, the user may apply multiple pulls to handle 127 in order to completely fold the folding components of chassis 150. In some embodiments, the folding process may commence at the particular height in which the cart 100 is positioned, e.g., based on the multi-step locking mechanism 121.

In some embodiments, cart 100 may be implemented or manufactured by taking into account, for example, the average, the mean, or the common dimensions and/or heights and/or characteristics of popular vehicles in a particular market for which the cart 100 is intended; and by taking into account an average, a mean or a common cumulative volume of shopping items (e.g., for implementing an appropriate volume of basket 110). Some implementations may emphasize safety of operation, ease of operation, ability to operate the cart 100 (e.g., including the ability to fold and unfold the cart 100) by utilizing a minimal amount of physical force (e.g., to accommodate senior citizens), and the elimination of damage or scratches to the vehicle or its trunk.

In some embodiments, the chassis 150 may be implemented using multiple bars and beams, having multiple joints or pivot brackets. In some embodiments, each bar or beam (or a set of bar and beam) may support a pair of wheels (e.g., a front wheel and a corresponding rear wheel). In some embodiments, each bar or beam may be anchored to one or more (e.g., to two) anchoring points, in order to allow flexible folding. In some embodiments, bars or beams that are located at the right and left sides of the cart 100, may be interconnected using one or more horizontal axles, in order to increase the stability of the cart 100 and the chassis 150, and to avoid an instable "shaking" of the cart 100 sideways. In some embodiments, such bars and beams may be implemented to minimally protrude beyond the basket 110, in order to allow a small form factor of the cart 100 once folded.

In some embodiments, cart 100 may be implemented in order to allow convenient folding of cart 100 into a collapsed or folded cart 100 having a relatively-small form factor. For example, the rear wheels 151-152 (and the horizontal rear axle 156 connecting them) may fold towards the rear side of the cart 100, such that upon folding of cart 100 they are located behind the basket 110 and/or externally to basket 110. In some embodiments, a gap 199 may be introduced into rails 117, dividing each one of rails 117 into two rail-portions separated by the gap 199. The gap 199 may be implemented as a cavity able to accommodate the horizontal front axle 155 upon folding of cart 100. The gap 199 may be sufficiently small to allow the bridge element 116 to be able to continuously glide or move along the two rail-portions of each rail 117, including over the gap 199. Other suitable implementations may be used.

In some embodiments, cart 100 may be implemented using suitable dimensions and/or angles in order to allow stacking and/or nesting of multiple carts, or of multiple chassis components (e.g., if the basket 110 is detachable from the chassis 150). In some embodiments, for example, chassis 150 may be implemented to have a front side which is narrower and/or smaller then the rear side of chassis 150, in order to facilitate stacking or nesting of multiple units of chassis 150.

In some embodiments, other suitable combinations of basket, chassis, beams or bars, and wheels may be used. For example, in some embodiments, the basket 110 may be sufficiently strong and/or rigid to directly connect with a collapsible or foldable set of bars and/or beams, substantially without a chassis or through a relatively small or light-weight chassis. In some embodiments, the bridge element 116 may be connected to other suitable portions of the cart 100, for example, to the basket 110, to the bottom of basket 110, underneath the basket 110, in front of the basket 110, to the chassis 150, to one or more of the bars and/or beams of cart 100, to multiple components of cart 100, or the like. Other suitable implementations may be used.

In some embodiments, cart 100 may be implemented using other mechanisms. For example, in some embodiments, basket 110 may be detachable from chassis 150, and a particular mechanism may be used (e.g., instead of the folding mechanism described above) for safe insertion of basket 110 into a trunk of a vehicle. For example, a sliding mechanism may include a first sliding member attached to basket 110, and/or a second sliding member attached to chassis. The chassis may include a collapsible or extendable track or rail which guides the basket 110 (once detached) safely into the trunk of the vehicle. The basket 110 may include one or more rollers or gliding wheels which allow the basket 110 to move smoothly along its trail into the trunk. One or more connectors may be used to attach the basket 110 to the chassis 150, and to selectively detach (by the user) the basket 110 from the chassis 150. For example, when the user wishes to transfer the basket 110 into the vehicle trunk, the user pulls the rail from the chassis 150 towards the car trunk; the user unlocks the basket 110 (namely, detaches the basket 110 from the chassis 150 by releasing one or more clips or locks of connectors); and the user pushes the basket 110 along the extended rail. After the safe landing of the basket 110 in the vehicle trunk, the user returns the rail back to its original folded place. In contrast, when the user wishes to transfer the basket 110 from the vehicle trunk to be attached to the chassis 150 which stands outside of the vehicle, the user pulls the rail from the chassis 150 into to the vehicle trunk, and then pushes the basket 110 towards the chassis 150 along the rail. When the basket 110 reaches the rear end on the chassis 150, the basket 110 is locked, for example, manually by the user, or automatically due to a locking mechanism or a clip or other component of connectors which auto-activates once the basket 110 reaches the rear end of the chassis 110; and the rail may then be put back to its original folded state. In some embodiments, other suitable implementations may be used.

Figure 4A:
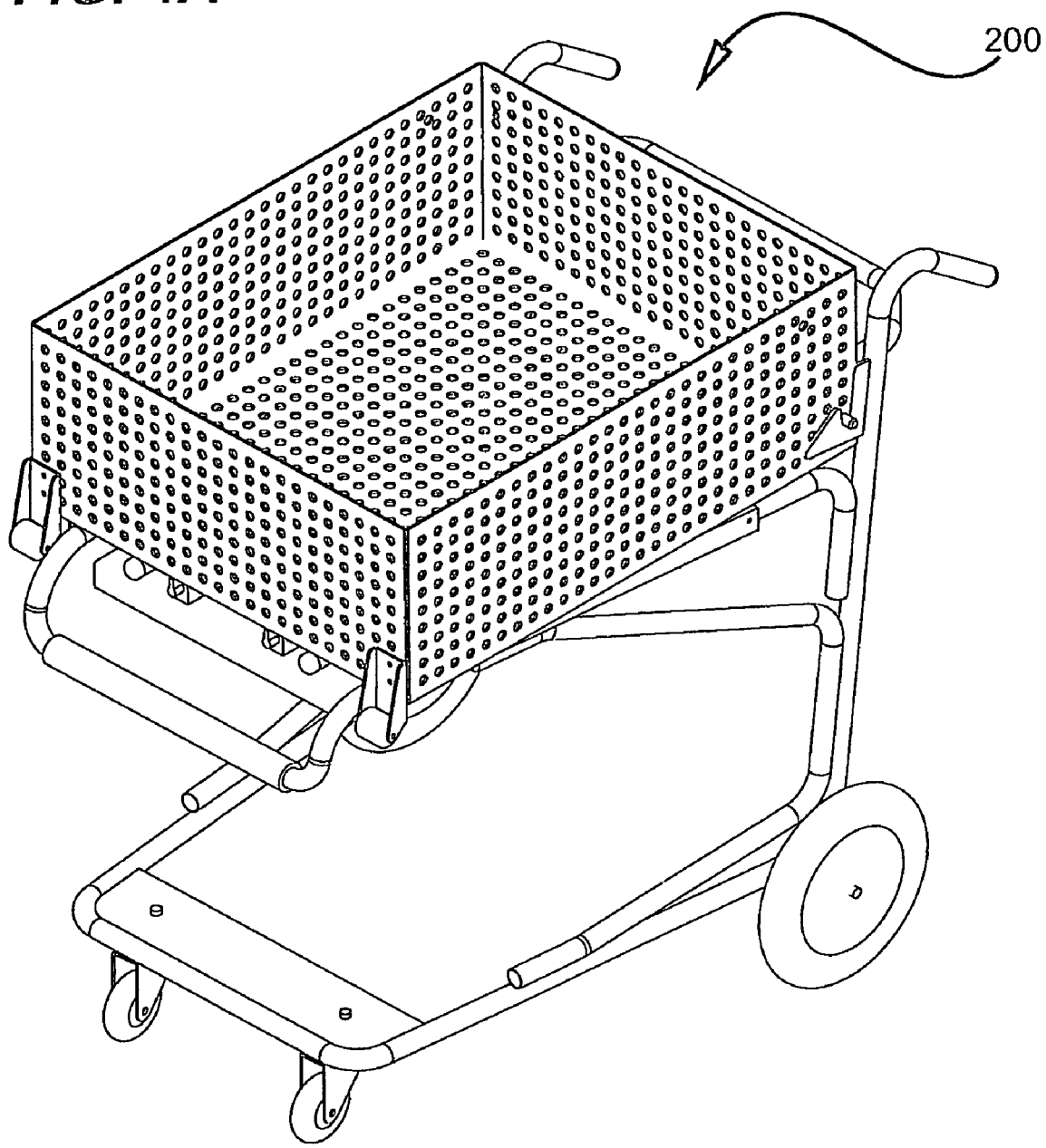
FIG. 4A is a schematic illustration of a three-dimensional isometric top-view of another cart in an unfolded state, in accordance with some demonstrative embodiments.
Figure 4B:
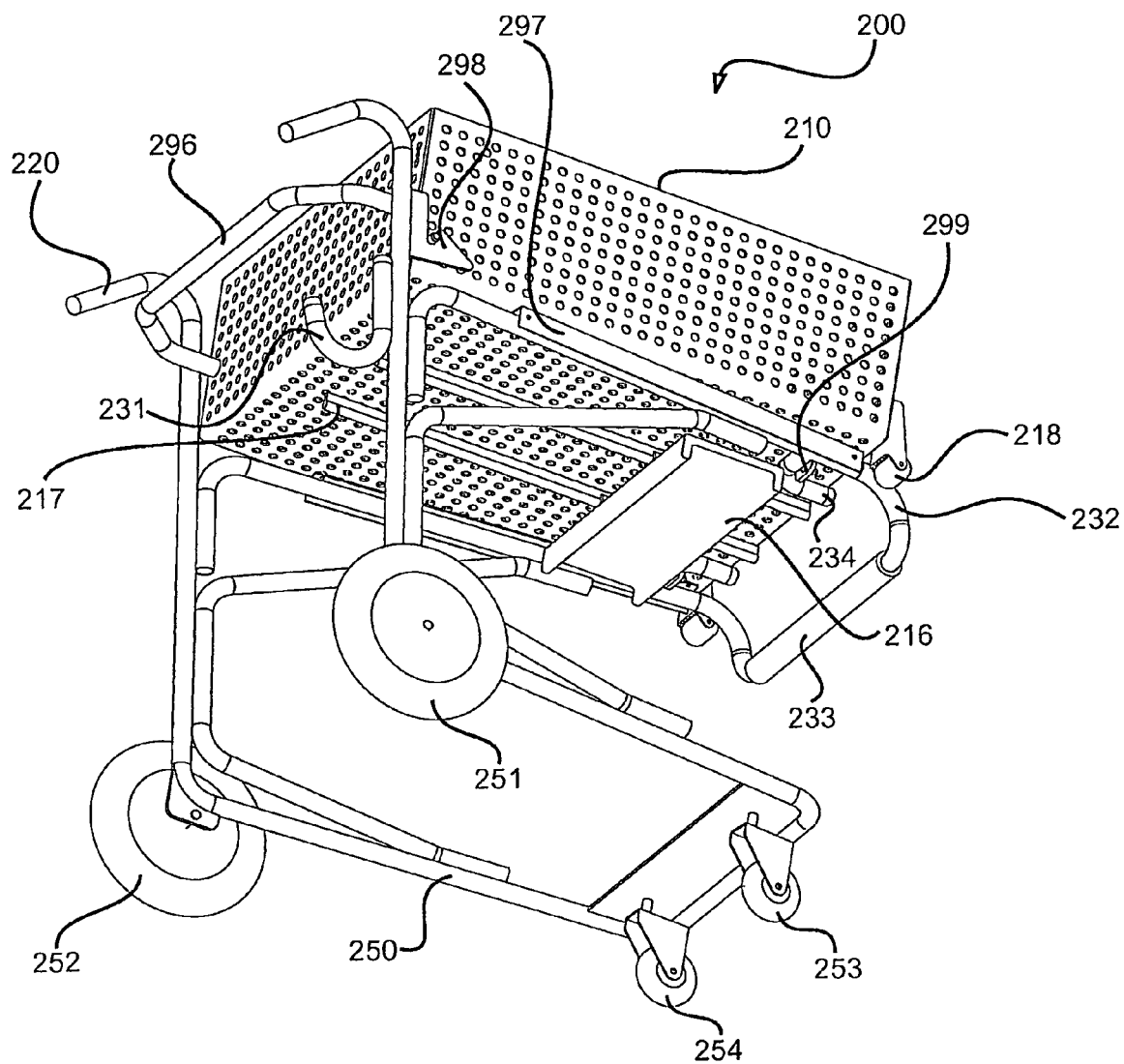
FIG. 4B is a schematic illustration of a three-dimensional isometric bottom-view of the cart in an unfolded state, in accordance with some demonstrative embodiments.
Figure 4C:
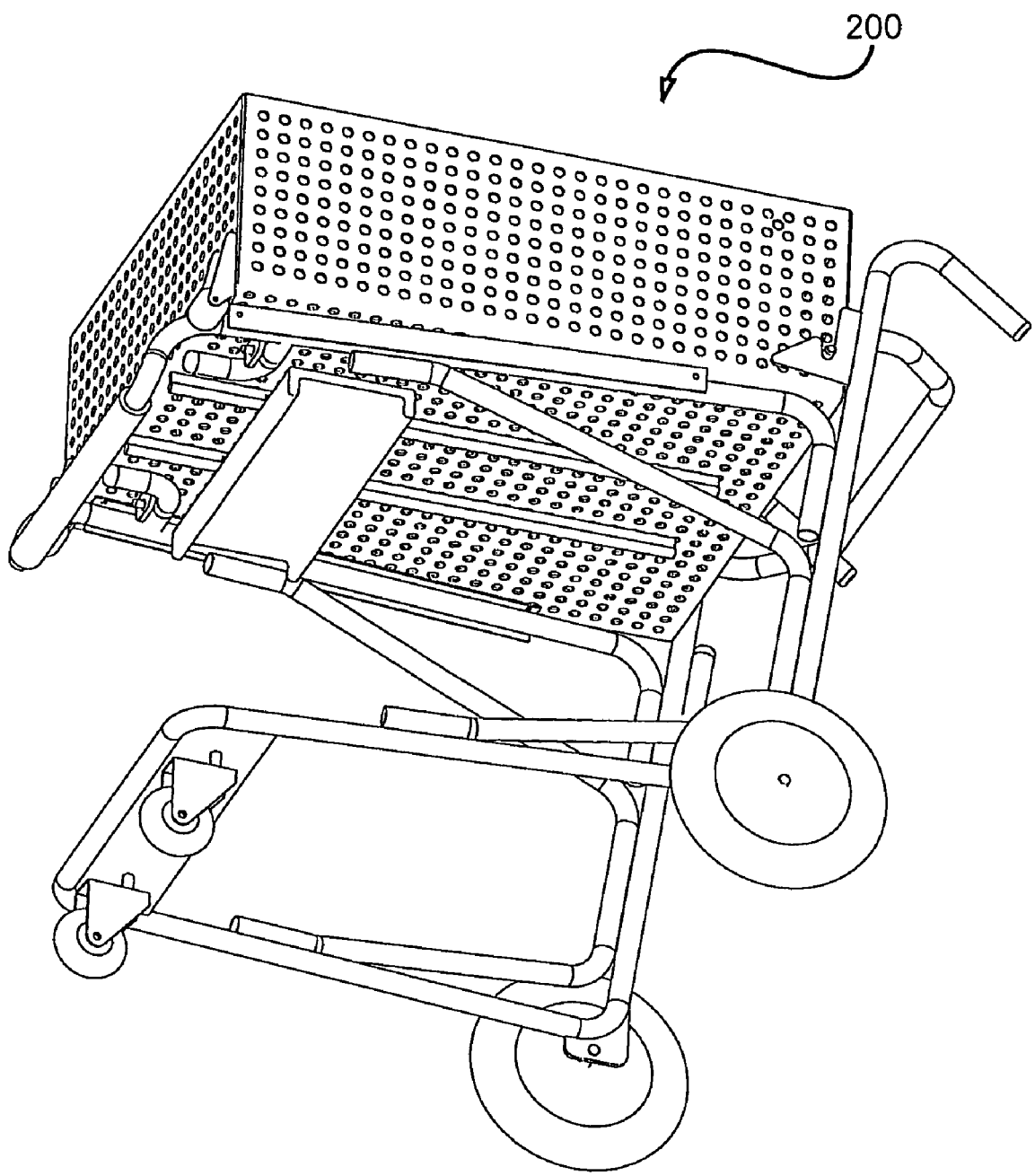
FIG. 4C is a schematic illustration of another three-dimensional isometric bottom-view of the cart in an unfolded state, in accordance with some demonstrative embodiments.
Figure 4D:
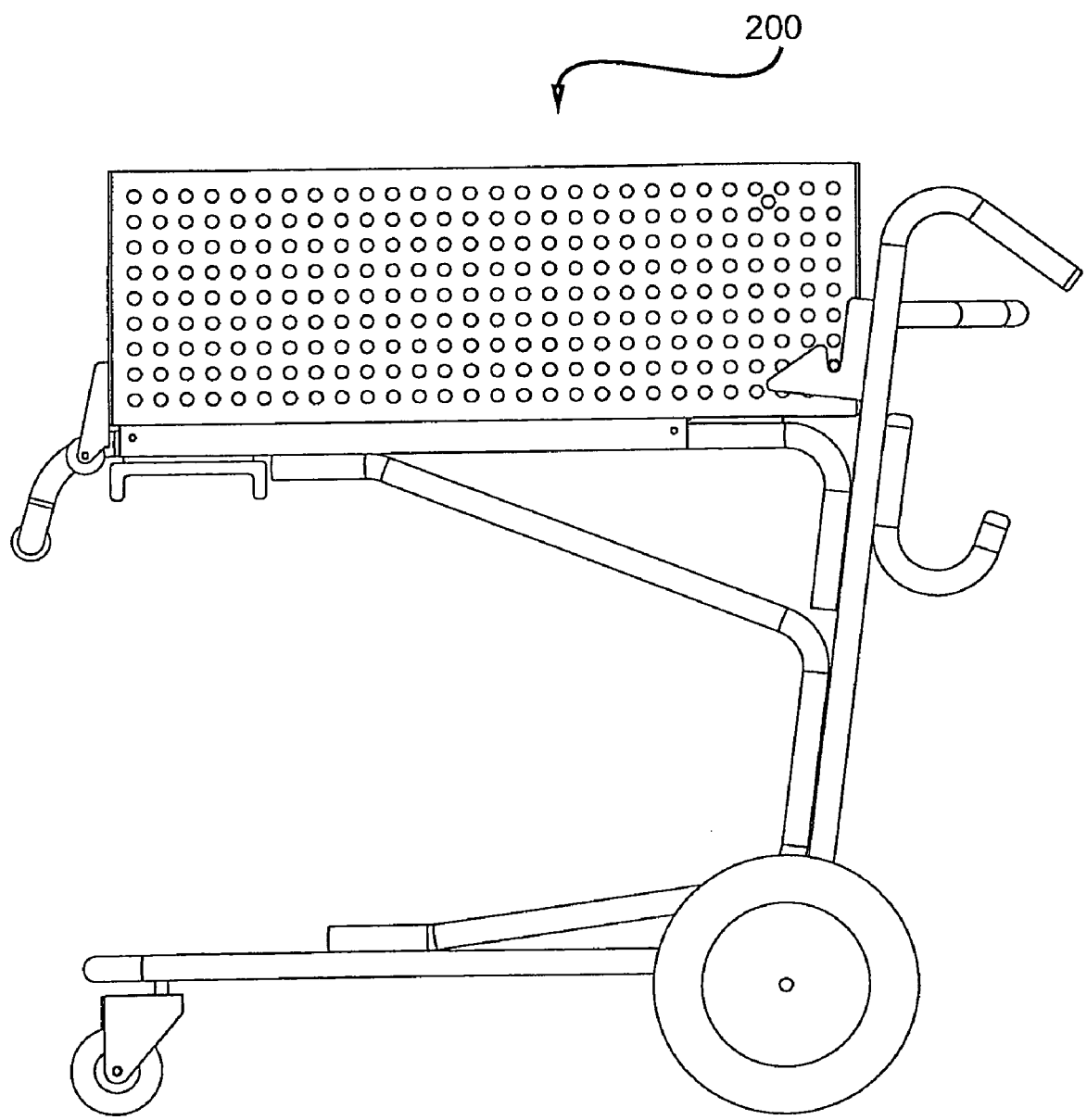
FIG. 4D is a schematic illustration of a side-view of the cart in an unfolded state, in accordance with some demonstrative embodiments.
Figure 4E:
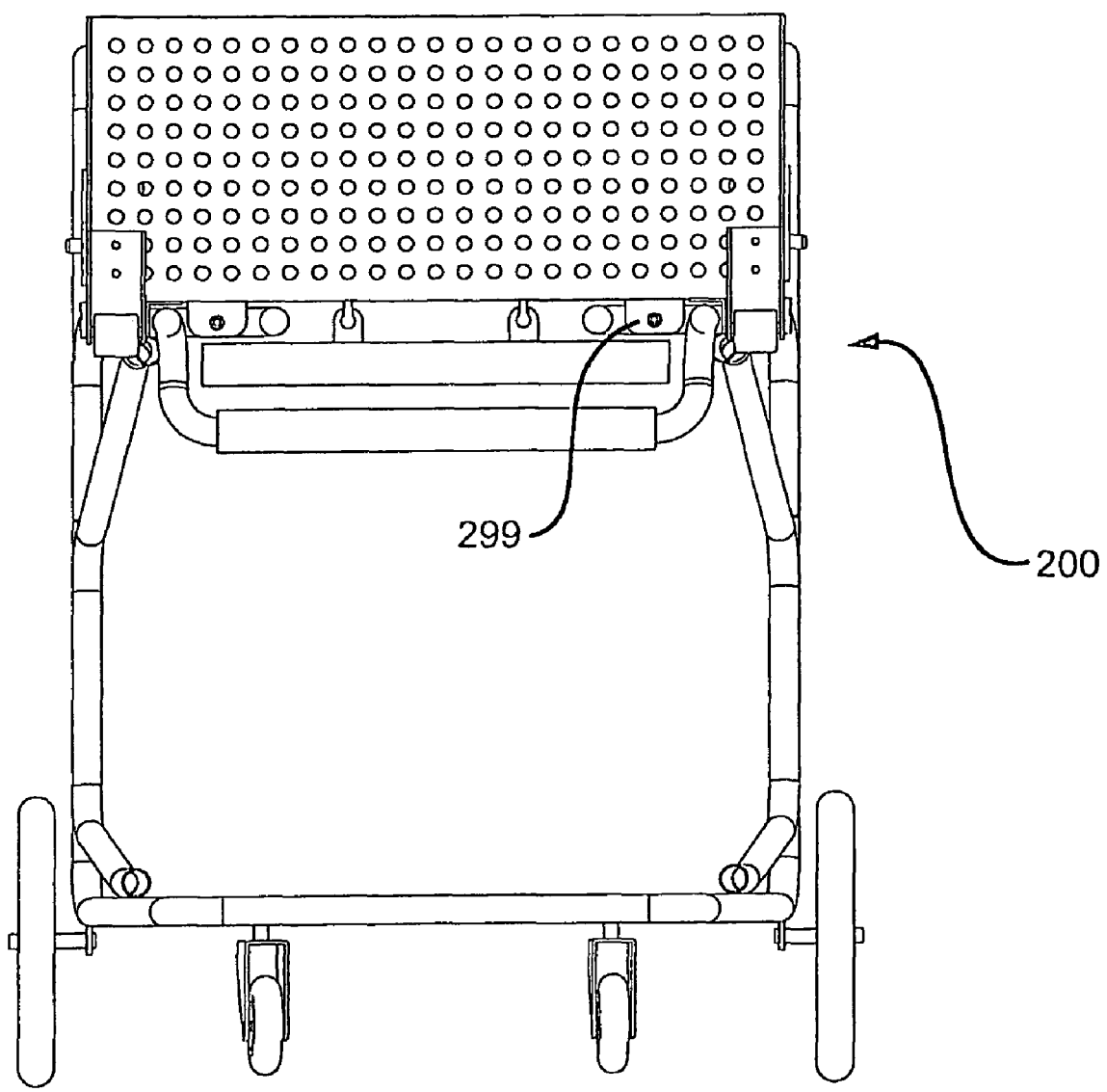
FIG. 4E is a schematic illustration of a front-view of the cart in an unfolded state, in accordance with some demonstrative embodiments.
Figure 4F:
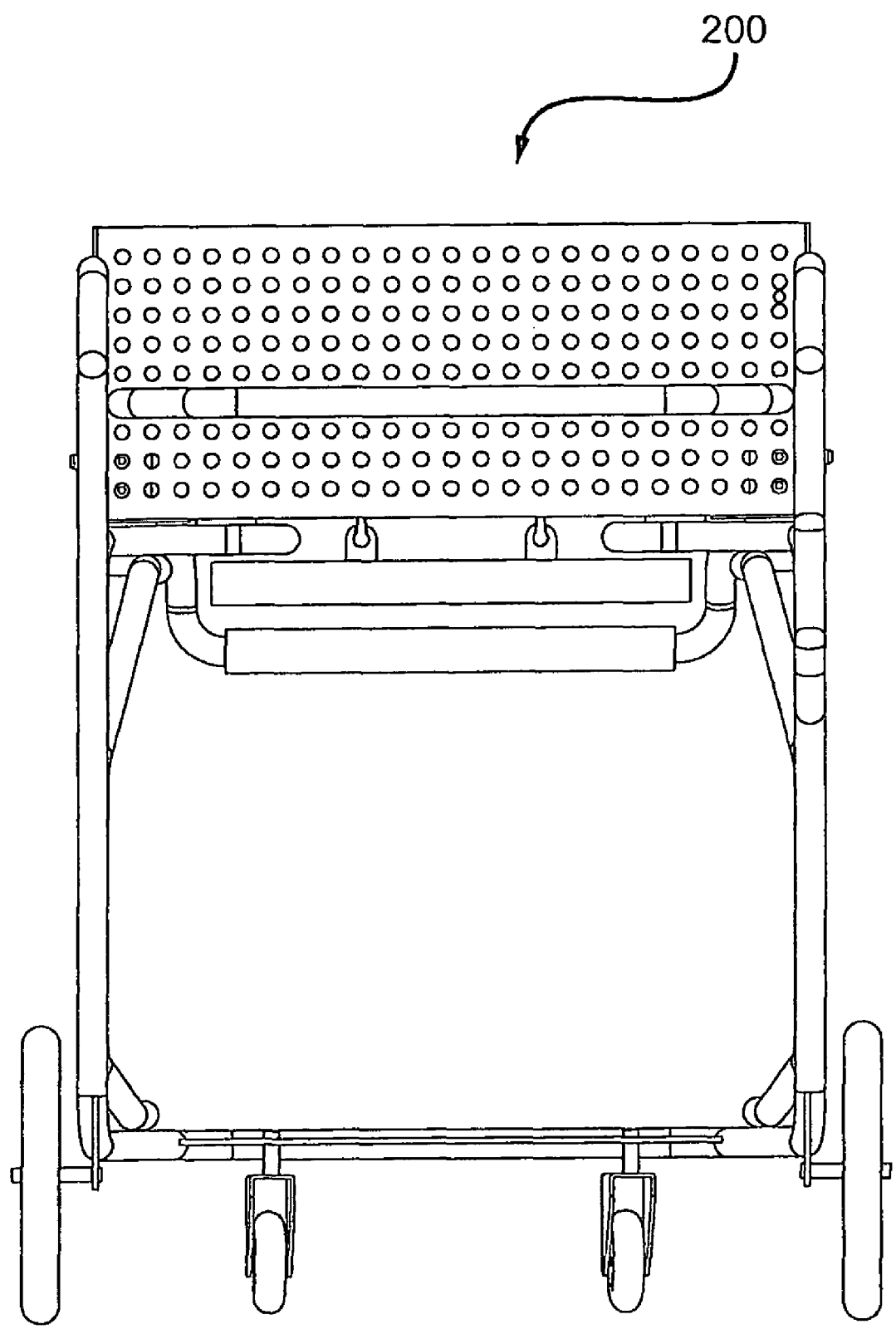
FIG. 4F is a schematic illustration of a rear-view of the cart in an unfolded state, in accordance with some demonstrative embodiments.

Reference is now made to FIG. 4A, which is a schematic illustration of a three-dimensional isometric top-view of a cart 200 in an unfolded state, in accordance with some demonstrative embodiments; to FIG. 4B, which is a schematic illustration of a three-dimensional isometric bottom-view of cart 200 in an unfolded state, in accordance with some demonstrative embodiments; to FIG. 4C, which is a schematic illustration of another three-dimensional isometric bottom-view of cart 200 in an unfolded state, in accordance with some demonstrative embodiments; to FIG. 4D, which is a schematic illustration of a side-view of cart 200 in an unfolded state, in accordance with some demonstrative embodiments; to FIG. 4E, which is a schematic illustration of a front-view of cart 200 in an unfolded state, in accordance with some demonstrative embodiments; and to FIG. 4F, which is a schematic illustration of a rear-view of cart 200 in an unfolded state, in accordance with some demonstrative embodiments.

Cart 200 may include components which may be similar to the components of cart 100 described above, for example, a basket 210 and a chassis 250. In accordance with some embodiments, in cart 200, the basket 210 is attachable and detachable from chassis 250 (e.g., using one or more connectors, clips or locks).

In some embodiments, basket 210 and chassis 250 may include one or more front-side connectors 299, as well as one or more rear-side connectors 298, allowing the user of cart 200 to attach basket 210 to chassis 250, and to detach or release or separate basket 210 from chassis 250. Connectors 298 and 299 may be of a common type or of different types. For example, connectors 298 and/or 299 may include a connection mechanism in which a pin, a tooth, or a protrusion is insertable to (and removable from) a corresponding hole, recess, tunnel, cavity, corner holder, or other suitable member; as well as other suitable attachment/detachment mechanisms or locking/unlocking mechanisms.

In some embodiments, basket 210 and/or chassis 250 may include one or more guiding rails 297 or other suitable guiding components, in order to guide and/or to facilitate the insertion of the basket 210 into its corresponding place on top of chassis 250. For example, the guiding rails 297 may guide the basket 210 (e.g., when pushed towards the chassis 250 or along the chassis 250) towards the center of the chassis 250 and/or towards the rear-side connectors 298.

In some embodiments, chassis 250 includes a set of bars and beams, as well as four wheels 251-254; other suitable number of wheels may be used. In some embodiments, rear wheels 251-252 may be larger, or significantly larger (e.g., at least 50 percent larger), than front wheels 253-254; this may improve the stability of cart 200, and/or may allow efficient pulling backwards of cart 200 (e.g., onto a stair, a set of stairs, a ramp, a pavement, or the like). Chassis 250 may further include one or more handles 220, as well as a hook 231 for hanging a bag or purse.

In some embodiments, cart 200 may be implemented using suitable dimensions and/or angles and/or characteristics in order to allow stacking and/or nesting of multiple carts, or of multiple chassis components (e.g., once the basket 210 is detached from the chassis 250). In some embodiments, for example, chassis 250 may be implemented to have a front side which is narrower or smaller then the rear side, in order to facilitate stacking or nesting of multiple units of chassis 250.

The bottom side of basket 210 may include, or may be connected to, one or more tracks or rails 217, on which an upside-down U-shaped bridge element 216 may be connected and may be movable thereon.

A user may utilize cart 200 by placing items inside the basket 210 (e.g., in a store or a supermarket), and may push the cart 200 from the checkout point to the user's vehicle. The user may open the trunk of the vehicle, and may gently push the cart 200 forward until the front side of cart 200 reaches the elevated edge of the vehicular trunk. In some embodiments, chassis 250 may include a reaching bar 232, for example, located at the front of chassis 250 and under the plane of bridge element 216. The reaching bar 232 may block the user of cart 200 too hard into the vehicle, and may indicate to the user that the edge of the chassis 250 reached the edge of the vehicular trunk. In some embodiments, one or more portions of the reaching bar 232 may be covered or coated with a sleeve 233, for example, made of plastic or foam or a non-rigid material, which may absorb force applied by the user who may push the cart 200 forward towards the trunk, and/or may avoid scratching or damaging the vehicle upon contact between the chassis 250 and the vehicle.

In some embodiments, cart 200 may be implemented, for example, such that when bridge element 216 is located slightly higher than the trunk edge of the vehicle, or slightly higher than an average or common height of vehicular trunks. For example, once the reaching bar 232 touches the vehicle or its trunk, the bridge element 216 may be located above the edge of the vehicular trunk. The user may detach the basket 210 from the chassis 250 (or vice versa), using the suitable clips, locks or other connectors of cart 200. Optionally, the user may assist the basket 210 to drop gently a few centimeters, such that bridge element 216 is mounted on the edge of the vehicular trunk. At this point in time, the basket 210 is still held by the chassis 250 (from which basket 210 was already detached), and by the bridge element 216 which lays on the edge of the vehicular trunk.

Then, the user pushes forward the basket 210, applying force in a forward direction, while maintaining the bridge element 216 static and non-moving. In some embodiments, cart 200 may include two separate handles 220 (e.g., in contrast with the single horizontal handle 120 discussed above), in order to facilitate the access of the user to the basket 210 and to facilitate the pushing forward of the basket 210 without obstruction by the handles 220 (e.g., the user optionally standing between the two handles 220). In some embodiments, cart 200 may include a set of handles, for example: two separate side-handles 220; as well as a horizontal handle or a "n" shaped handle or a central handle 296, which may be slightly narrower than the distance between the two separate side-handles 220, and may have chamfered corners or rounded corners or diagonally-cut corners, in order further facilitate the user's access to the basket 210, and/or to facilitate the user-controlled lifting and/or releasing of basket 210, and/or to further facilitate the guiding or centering of the basket 210 relative to the rear side of chassis 250 (e.g., further to the guiding provided by the guiding rails 297). Other suitable handle combinations may be used.

Due to the rails 217, basket 210 glides or slides forward towards and/or into the trunk; during this forward motion of basket 210, the bridge element 216 remains substantially static and non-moving relative to the trunk. Optionally, one or more guiding wheels 218 may be connected to the bottom-front section of basket 210, and may help the user to produce a smooth and scratch-free guiding of the detached basket 210 into the trunk.

In some embodiments, optionally, chassis 250 may be implemented using a suitable set of beams and/or bars, for example, one or more "L" shaped or "n" shaped support bars 234, which may support the detached basket 210 during its gliding into the trunk, and to ensure that the detached basket 210 does not fall to the ground (e.g., through a vertical "cavity" within the chassis 250.

Once the rear end of the rails 217 reaches the bridge element 216, the user may finalize the insertion of the basket 210 into the vehicular trunk. For example, the user may slightly lift the rear side of the basket 210 by a few centimeters (e.g., to release the bridge element 216 from the edge of the trunk); the user may gently push forward the basket 210, thereby guiding the basket 210 (using the guiding wheels 218) a few centimeters forward to traverse the trunk edge; and the user may then gently lower the rear end of the basket 210 until the entire basket 210 rests firmly within the trunk.

Upon placement of the basket 210 within the trunk, the user may handle the chassis 250 which is outside the trunk. In some embodiments, the chassis 250 may be non-collapsible or non-foldable, and the user may return the chassis 250 to the shop, or the user may push the chassis 250 to a designated storage place for chassis units (e.g., optionally nesting multiple chassis units). In other embodiments, chassis 250 may be collapsible or foldable, for example, using one or more joints or pivot brackets (e.g., as described above), and the user may fold or collapse the chassis 250 and may then place the folded chassis 250 inside the trunk or inside the vehicle's passenger cabin.

In some embodiments, removal of the basket 210 from the vehicular trunk may be performed using a set of reversed operations. In some embodiments, for example, the user may lift the rear end of the basket 210, and may pull it back a few centimeters, in order to position the bridge element 216 over the edge of the trunk. The user may then pull back the basket 210 relative to the static bridge element 216, and the basket 210 may move outward using the rails 217. Once the front side of the rails 217 reaches the bridge element 216, the user connects or attaches the basket 210 to the chassis 250 located outside the trunk and underneath the pulled-back basket 210; and optionally, the user slightly lifts the front side of the basket 210 in order to release the bridge element 216 from the trunk edge. Other suitable operations or sets of operations may be used.

In some embodiments, the rear end of basket 210 may include, or may be connected to, a gripping handle to facilitate the lifting or lowering of the rear end of basket 210. In some embodiments, the top portion of chassis 250 may include bars and beams that are substantially horizontal or substantially parallel to the ground; in other embodiments, bars and beams in the top portion of chassis 250 may be diagonal or slightly diagonal relative to the ground (e.g., going down towards the front side of the chassis 250, at an angel of 10 degrees), for example, in order to accommodate insertion of the basket 210 into low-height trunks, and/or in order to allow nesting of multiple chassis units.

In some embodiments, basket 210 (or basket 110 described above) may be implemented to include sub-baskets or other sub-containers, e.g., to allow orderly placement or storage or grouping of various items (e.g., fruits and vegetables, or chilled items, or frozen items), and/or to allow convenient and selective partial removal of one or more sub-containers independently of the removal of other sub-containers.

Figure 5:
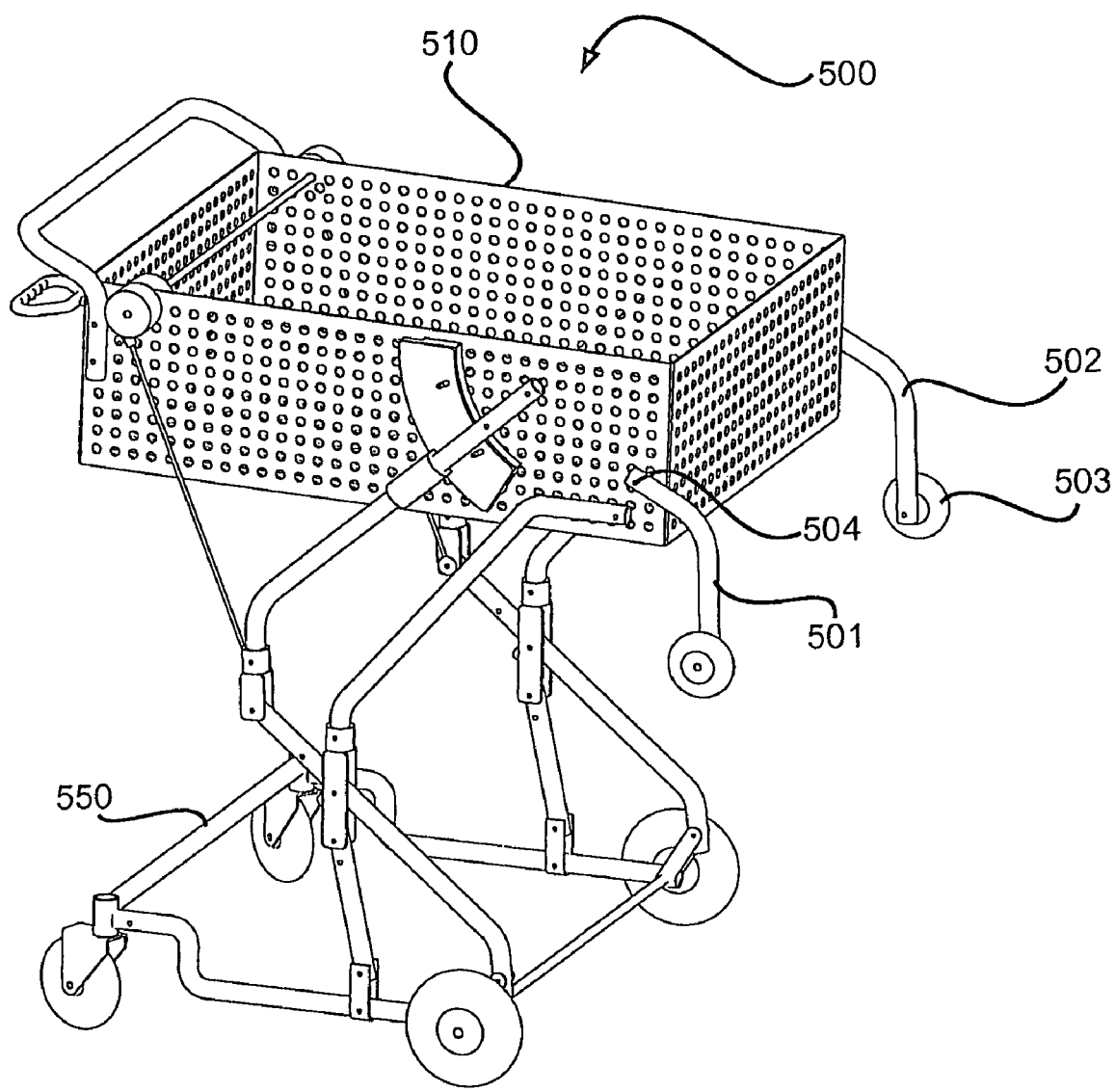
FIG. 5 is a schematic illustration of a three-dimensional isometric top-view of another cart in an unfolded state, in accordance with some demonstrative embodiments.

FIG. 5 is a schematic illustration of a three-dimensional isometric top-view of a cart 500 in an unfolded state, in accordance with some demonstrative embodiments. Cart 500 and its components may be generally similar to cart 100 of FIG. 1A and its components.

Cart 500 may include a trunk penetration component 501 (or other trunk invasion component) which may be used in addition to a bridge element or instead of a bridge element. Cart 500 includes a basket 510 and a chassis 550 (e.g., a collapsible or foldable chassis). For demonstrative purposes, cart 500 is shown without a bridge element, and with a trunk penetration component 501 implemented using two curved legs 502 extending from the front side of the basket 510, or from the bottom-front side of basket 510. In other embodiments, a single leg, or three or more legs, may be used; for example, one central leg may be used, or two side-legs may be used as shown, or other suitable combinations may be used. In still other embodiments, the legs need not be curved, and may be substantially linear, may be diagonal (e.g., extending diagonally downward and forward from the basket 510), may be S-shaped, may be L-shaped, or the like. In some embodiments, the one or more legs 502 may terminate with one or more wheels 503, in order to allow smooth and substantially scratch-free and/or friction-free sliding motion of the basket 510 into the trunk of the vehicle (e.g., upon collapsing or folding of the cart 500 and/or of the chassis 550). In some embodiments, the one or more legs 502 may be rotatable or retractable using a hinge 504, in order to allow the folding backwards (e.g., towards the basket 510) of the one or more legs 502 upon complete insertion of the cart 500 into the vehicular trunk; and optionally allowing the one or more legs 502 to enter, partially or entirely, into one or more corresponding cavities or recesses or leg-holders, which may be included in basket 510 or externally to basket 510 in order to contain or hold the one or more legs 502. Other suitable mechanisms may be used for invasion or penetration of vehicular trunks, and/or for allowing smooth insertion of the collapsible cart 500 into the vehicular trunk.

The terms "plurality" or "a plurality" as used herein include, for example, "multiple" or "two or more". For example, "a plurality of items" includes two or more items.

The word "comprising" as used herein includes, for example, the term "including at least but not limited to". The term "comprises" as used herein includes, for example, the term "includes at least but not limited to".

Functions, operations, components and/or features described herein with reference to one or more embodiments, may be combined with, or may be utilized in combination with, one or more other functions, operations, components and/or features described herein with reference to one or more other embodiments, or vice versa.

While certain features of some embodiments have been illustrated and described herein, many modifications, substitutions, changes, and equivalents may occur to those skilled in the art. Accordingly, the following claims are intended to cover all such modifications, substitutions, changes, and equivalents.

What is claimed is:

1. A cart comprising:
a chassis connected to a plurality of wheels;
a basket mounted on the chassis and adapted to store one or more items therein; and
a bridge element which is formed as an integral part of the cart and is adapted to fit onto an edge of a vehicular trunk, wherein the bridge element of the cart is at an area of said cart located between said basket and said wheels;
wherein the bridge element is suspended from and moveable on one or more rails connected underneath the basket substantially in parallel to a long axis of the basket.

2. The cart of claim 1, wherein the bridge element is moveable on one or more rails connected to the chassis substantially in parallel to a long axis of the basket.

3. The cart of claim 1, wherein a longest dimension of said upside-down-U shaped bridge element is generally perpendicular to a longest dimension of said cart.

4. The cart of claim 1, wherein the basket extends forward relative to the chassis.

5. The cart of claim 4, wherein the bridge element is adapted to reach a position extending beyond the length of the basket.

6. The cart of claim 1, comprising:
one or more wheels connected at a bottom of a front end of the basket, to smoothly glide the basket on a bottom of the vehicular trunk.

7. The cart of claim 1, wherein the chassis comprises:
a first set of one or more collapsible beams, connecting a right side of the basket with a right side of the chassis at a first point located above a lowest edge of the chassis; and
a second set of one or more collapsible beams, connecting a left side of the basket with a left side of the chassis at a second point located above the lowest edge of the chassis.

8. The cart of claim 7, wherein the first set of collapsible beams comprises one or more pivot brackets able to collapse said first set of collapsible beams; and wherein the second set of collapsible beams comprises one or more pivot brackets able to collapse said second set of collapsible beams.

9. The cart of claim 7, wherein at least one of the first and second sets of collapsible beams is connected through to a pullable cable adapted to collapse said at least one set of collapsible beams upon pulling of said cable.

10. The cart of claim 9, wherein an end of the cable is connected to a handle adapted to be pulled by a hand of a human being.

11. The cart of claim 10, wherein the cable passes through a one-way roll-up mechanism adapted to maintain the cable partially pulled upon release of said handle.

12. The cart of claim 8, wherein a height of the basket from the ground is user-modifiable by modifying an angle of one or more of the pivot brackets.

13. The cart of claim 12, comprising:
a multi-step locking mechanism adapted to lock the height from the ground of the basket at a particular height set by a user.

14. The cart of claim 13, wherein the multi-step locking mechanism comprises:
a set of ratchets; and
a sliding pole, adapted to be moveable along a downward direction along said set of ratchets, and adapted to be unmovable along an upward direction along said set of ratchets.

15. The cart of claim 14, wherein the multi-step locking mechanism is lockable to disallow folding of the chassis, and is unlockable to allow folding of the chassis.

16. The cart of claim 1, wherein the basket is detachably attached to said chassis through one or more connectors.

17. The cart of claim 16, wherein the chassis comprises an extendable rail; and wherein the basket is adapted, upon its release from said chassis, to glide along said extendable rail into said vehicular trunk.

18. The cart of claim 17, comprising:
one or more wheels connected at a bottom of a front end of the basket, to smoothly glide the basket on a bottom of said vehicular trunk.

19. The cart of claim 1, wherein one or more rails are connected underneath the basket and are connected to said bridge element; wherein the basket is detachable from the chassis; and wherein the basket is forward-movable along said one or more rails and relative to said bridge element when said bridge element is positioned over the edge of said vehicular trunk.

* * * * *